US010260725B2

(12) United States Patent
Lin et al.

(10) Patent No.: US 10,260,725 B2
(45) Date of Patent: Apr. 16, 2019

(54) LIGHT EMITTING DEVICE

(71) Applicant: PlayNitride Inc., Tainan (TW)

(72) Inventors: Jun-Yu Lin, Tainan (TW); Wen-Jie Lu, Tainan (TW); Kuan-Yung Liao, Tainan (TW); Sheng-Yuan Sun, Tainan (TW)

(73) Assignee: PlayNitride Inc., Tainan (TW)

( * ) Notice: Subject to any disclaimer, the term of this patent is extended or adjusted under 35 U.S.C. 154(b) by 44 days.

(21) Appl. No.: 15/192,715

(22) Filed: Jun. 24, 2016

(65) Prior Publication Data

US 2017/0051907 A1 Feb. 23, 2017

(30) Foreign Application Priority Data

Aug. 20, 2015 (TW) ............................. 104127087 A

(51) Int. Cl.

*B60Q 1/06* (2006.01)
*F21V 29/60* (2015.01)
*F21V 29/503* (2015.01)
*F21V 29/507* (2015.01)
*F21V 29/83* (2015.01)
*F21Y 115/10* (2016.01)

(52) U.S. Cl.

CPC ............ *F21V 29/60* (2015.01); *F21V 29/503* (2015.01); *F21V 29/507* (2015.01); *F21V 29/83* (2015.01); *F21Y 2115/10* (2016.08)

(58) Field of Classification Search

CPC ........ F21V 29/60; F21V 29/67; F21V 29/507; F21V 29/503; F21V 29/83; F21Y 2115/10
USPC .......................................................... 362/373
See application file for complete search history.

(56) References Cited

U.S. PATENT DOCUMENTS

2008/0089028 A1* 4/2008 Kim .................. G02F 1/133608 361/695
2008/0285087 A1* 11/2008 Perkins ................. G06F 3/1446 358/400
2010/0264826 A1* 8/2010 Yatsuda .................... F21K 9/00 315/112

FOREIGN PATENT DOCUMENTS

CN 2872073 2/2007
CN 204153528 2/2015
(Continued)

OTHER PUBLICATIONS

Espacenet English translation of TW201007079, (reference was submitted in IDS by the applicant).*
(Continued)

*Primary Examiner* — Sean P Gramling
*Assistant Examiner* — Omar Rojas Cadima
(74) *Attorney, Agent, or Firm* — J.C. Patents

(57) ABSTRACT

A light emitting device includes a heat dissipation casing and an LED module. The heat dissipation casing includes an upper cover, a lower cover and a plurality of side covers. The upper cover has a plurality of first holes. The lower cover and the upper cover are opposite to each other. The side covers are connected to the upper cover and the lower cover, wherein there are at least two chamfered surfaces between the at least two side covers and the upper cover, and the chamfered surfaces have a plurality of second holes. The LED module is disposed inside the heat dissipation casing and located on the lower cover. The LED module has a light emitting surface, and the light emitting surface and the first and the second holes are respectively located on opposite sides of the LED module.

15 Claims, 7 Drawing Sheets

10

(56) References Cited

FOREIGN PATENT DOCUMENTS

| | | |
|---|---|---|
| CN | 204257166 | 4/2015 |
| TW | 201007079 | 2/2010 |

OTHER PUBLICATIONS

"Office Action of Taiwan Counterpart Application", dated Aug. 18, 2016, p. 1-p. 4, in which the listed references were cited.

* cited by examiner

LIGHT EMITTING DEVICE

CROSS-REFERENCE TO RELATED APPLICATION

This application claims the priority benefit of Taiwan application serial no. 104127087, filed on Aug. 20, 2015. The entirety of the above-mentioned patent application is hereby incorporated by reference herein and made a part of this specification.

BACKGROUND OF THE INVENTION

1. Field of the Invention

The invention relates to a light emitting device. More particularly, the invention relates to a light emitting device having a heat dissipation casing.

2. Description of Related Art

With the rapid development of science and technology in recent years, the operation efficiency of the light emitting components has become higher and higher. Consequently, the heating power of various light emitting components has also ascended constantly. In order to prevent the light emitting components from temporary or permanent malfunction caused by the overheating of the light emitting components, providing sufficient heat dissipation efficacy will become very important. In order to effectively reduce the heat produced by the operation of the light emitting component, the heat dissipation component can be installed on the light emitting component whose temperature is easily raised, such that the heat produced by the operation of the light emitting component can be removed quickly.

In the conventional art, the heat dissipation method includes natural convection and forced convection. For example, if the heat produced by the light emitting component is removed by natural convection, the natural convection is generally accomplished by disposing the heat dissipation block on the light emitting component, disposing the heat dissipation block and the light emitting component in the heat dissipation casing, and the air inlet and air outlet of the heat dissipation casing are disposed on the side cover and upper cover respectively. However, in the design of disposing the air inlet and air outlet on the side cover and upper cover of the heat dissipation casing respectively, the air inlet is shielded because of the side splicing of the components. Therefore, the air inletting area is reduced, thereby the heat dissipation effect is reduced.

SUMMARY OF THE INVENTION

The invention provides a light emitting device which has a better heat dissipation effect.

The light emitting device of the invention includes a heat dissipation casing and an LED module. The heat dissipation casing includes an upper cover, a lower cover and a plurality of side covers. The upper cover has a plurality of first holes. The lower cover and the upper cover are opposite to each other. The side covers are connected to the upper cover and the lower cover, wherein at least two chamfered surfaces are between at least two of the side covers and the upper cover, and the chamfered surfaces have a plurality of second holes. The LED module is disposed inside the heat dissipation casing and located on the lower cover, wherein the LED module has a light emitting surface, and the light emitting surface and the first and the second holes are located on opposite sides of the LED module respectively.

In the embodiment of the invention, an angle between a first normal vector of the upper cover and a second normal vector of any of the chamfered surfaces is smaller than 90 degrees.

In the embodiment of the invention, the angle between the first normal vector of the upper cover and the second normal vector of any of the chamfered surfaces is smaller than 90 degrees and greater than 45 degrees.

In the embodiment of the invention, the chamfered surfaces are at least two bevels or at least two round chamfered surfaces.

In the embodiment of the invention, an arrangement density of the first holes is greater than an arrangement density of the second holes.

In the embodiment of the invention, a total area of the second holes of the chamfered surfaces is smaller than a total area of the first holes of the upper cover.

In the embodiment of the invention, the upper cover includes two periphery portions and a middle portion located between the periphery portions, and a total area of the first holes located at the periphery portions is smaller than a total area of the first holes located at the middle portion.

In the embodiment of the invention, the chamfered surface includes two end surfaces and a middle surface located between the end surfaces, and a total area of the second holes located at the end surfaces is smaller than a total area of the second holes located at the middle surface.

In the embodiment of the invention, the heat dissipation casing further includes two air baffles dividing an interior of the heat dissipation casing into two fluid channels and one accommodating space, wherein the fluid channels are located on opposite sides of the accommodating space.

In the embodiment of the invention, the first holes are disposed in correspondence to the accommodating space, and the second holes are disposed in correspondence to the fluid channels.

In the embodiment of the invention, the light emitting device further includes a fan disposed inside the heat dissipation casing and located between the upper cover and the LED module.

In the embodiment of the invention, the light emitting device further includes a heat dissipation component disposed inside the heat dissipation casing and located between the upper cover and the LED module.

In the embodiment of the invention, a first height is between the upper cover and the lower cover, a second height is between the lower cover and one of the side covers connecting one of the chamfered surfaces, and a ratio of the first height and the second height is between 1.1 and 10.

Based on the above, since the second holes of the invention are located on the chamfered surfaces located at junctions between the upper cover and the side covers, that is, the second holes and the first holes of the heat dissipation casing are not coplanar, and the first and the second holes and the light emitting surface of the LED module are located on opposite sides of the LED module respectively, the inletting of a fluid into the heat dissipation casing and the exhausting of the fluid from the heat dissipation casing for heat dissipation do not interfere with each other. In addition, when the light emitting device is being side spliced, the second holes are not shielded because of the side splicing. So the effective ventilating area of the second holes can still be preserved and better heat dissipation effect can be provided.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
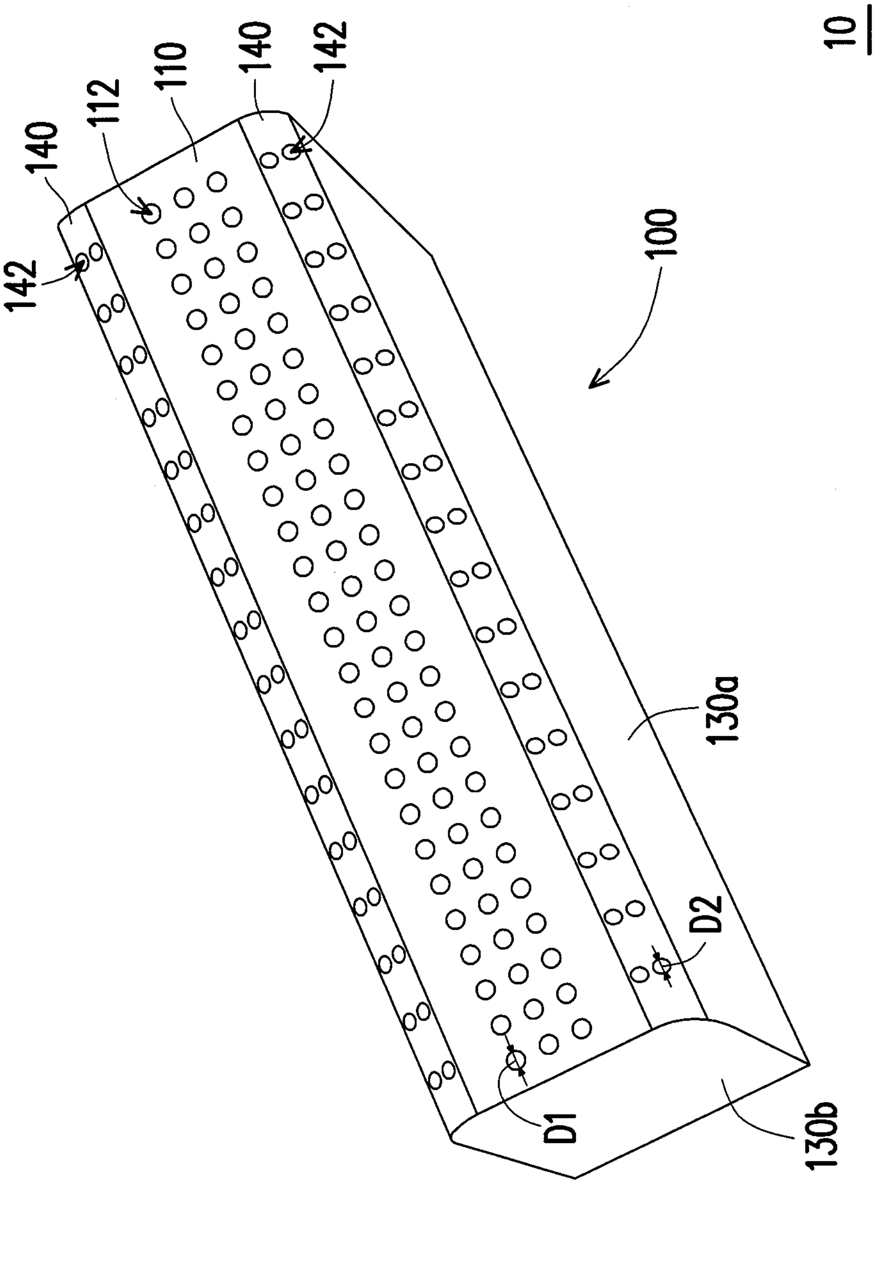
FIG. 1 is a schematic three-dimensional view of a light emitting device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
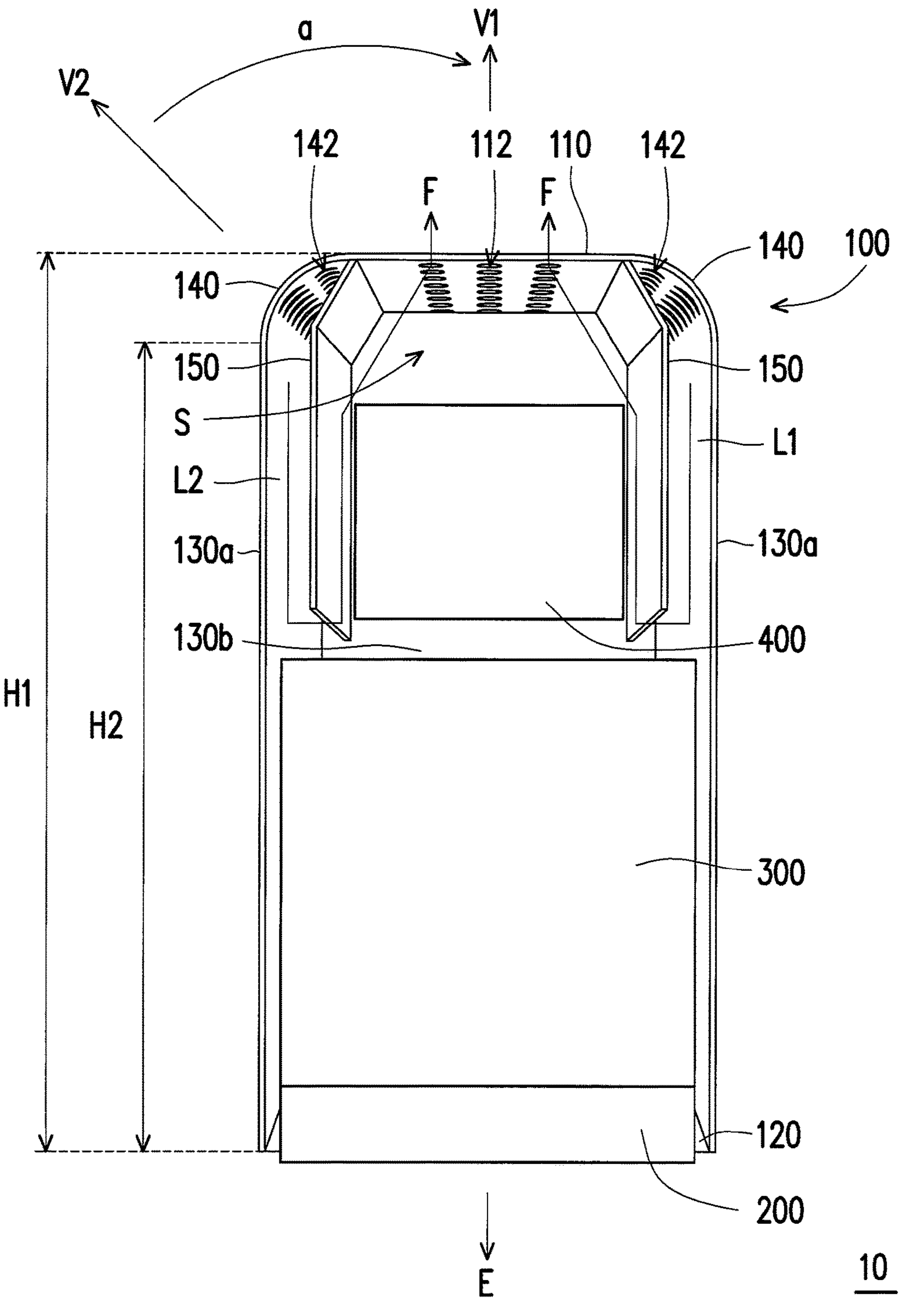
FIG. 2 is a schematic cross-sectional side view of a light emitting device according to an embodiment of the invention.

FIG. 1 is a schematic three-dimensional view of a light emitting device according to an embodiment of the invention. FIG. 2 is a schematic cross-sectional view of the light emitting device of FIG. 1. Referring to FIG. 1 and FIG. 2 simultaneously, a light emitting device 10 of the embodiment includes a heat dissipation casing 100 and an LED module 200. The heat dissipation casing 100 includes an upper cover 110, a lower cover 120 and a plurality of side covers 130*a* and 130*b*. The upper cover 110 has a plurality of first holes 112. The lower cover 120 and the upper cover 110 are opposite to each other. The side covers 130*a* and 130*b* are connected to the upper cover 110 and the lower cover 120, wherein at least two chamfered surfaces 140 are between at least two of the side covers 130*a* and the upper cover 110, and the chamfered surfaces 140 have a plurality of second holes 142. The LED module 200 is disposed inside the heat dissipation casing 100 and located on the lower cover 120, wherein the LED module 200 has a light emitting surface E, and the light emitting surface E and the first and the second holes 112, 142 are located on opposite sides of the LED module 200 respectively.

Specifically, the first holes 112 are merely located on the upper cover 110, and the second holes 142 are merely located on the chamfered surfaces 140. Besides, the light emitting surface E of the LED module 200 and the first and the second holes 112, 142 are located on opposite sides of the LED module 200 respectively. In other words, the emitted light of the LED module 200 does not illuminate on the first holes 112 and the second holes 142. Here, the fluid F (air, for example) enters the heat dissipation casing 100 through the second holes 142, so as to exhaust the heat produced by the LED module 200 out of the heat dissipation casing 100 through the first holes 112. Moreover, the fluid F can also enters the heat dissipation casing 100 through the first holes 112, and exhaust out of the heat dissipation casing 100 through the second holes 142. The invention is not limited thereto. In other words, the light emitting device 10 of the embodiment exhausts the heat produced by the LED module 200 out of the heat dissipation casing 100 through natural convection. It is noted that the lower cover 120 may be a transparent flat plate. As a result, the LED module 200 can control the light emitting area in accordance with the demands, to form a point light source, a surface light source or other desired light sources. The lower cover 120 may also be a positioning component (not shown), such that the LED module 200 is disposed on the lower cover 120. The descriptions above all fall within the scope of the invention seeking to protect. Therefore, when the LED module 200 is applied to the UV curing process, for example, the fluid F does not interfere with the light curing adhesive under irradiation because the light emitting surface E of the LED module 200 and the first and the second holes 112, 142 are located on opposite sides of the LED module 200 respectively. Thus, the heat dissipation and the UV curing can be carried out effectively.

Figure 2A:
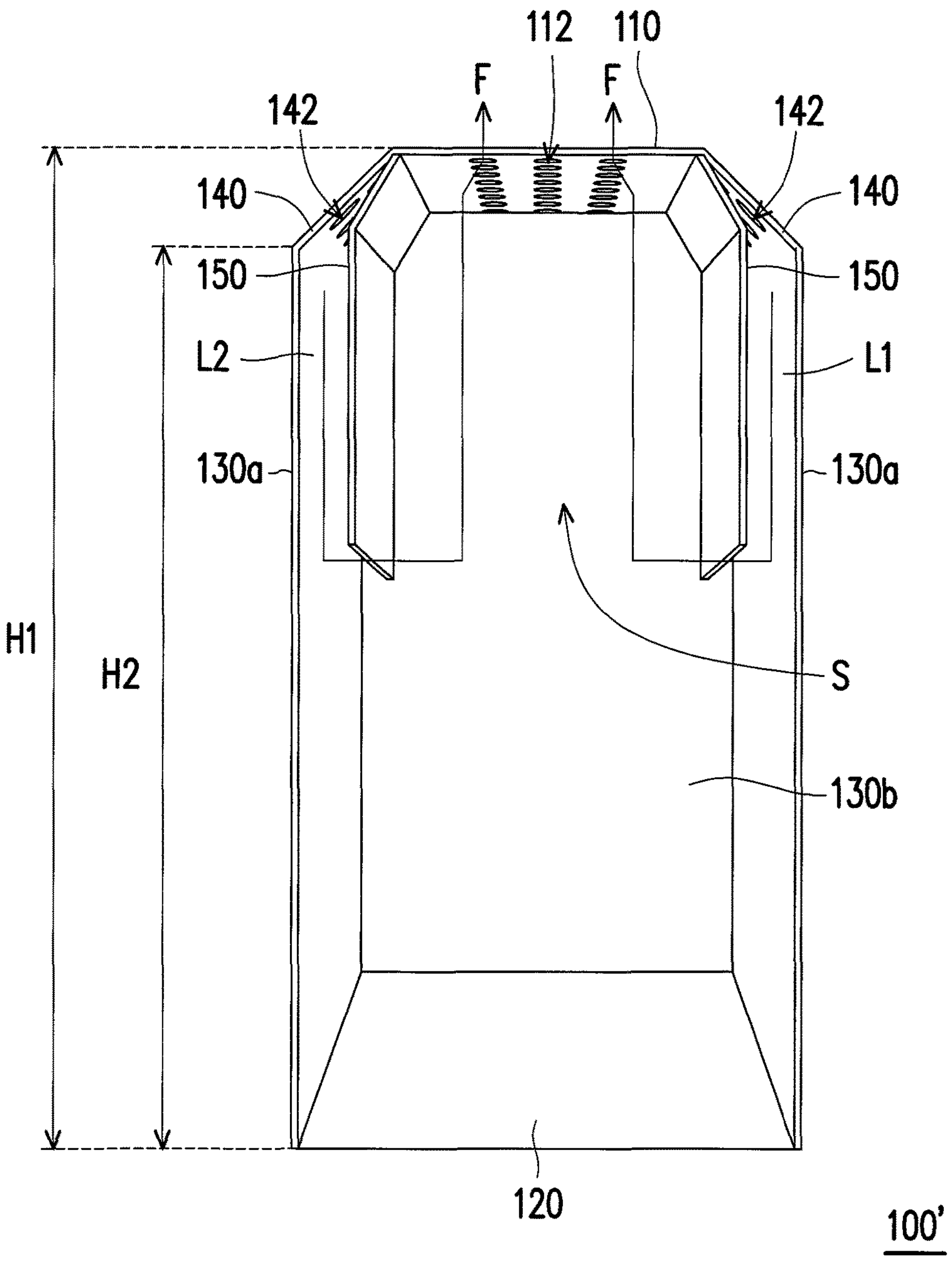
FIG. 2A is a schematic partial cross-sectional view of a heat dissipation casing of a light emitting device according to another embodiment of the invention.

Specifically, an angle a between a first normal vector V1 of the upper cover 110 and a second normal vector V2 of one of the chamfered surfaces 140 is smaller than 90 degrees. In detail, the second holes 142 and the first holes 112 are not coplanar, so the interference problem between the air inletting and exhausting is not produced when the first holes 112 and the second holes 142 serve as heat dissipation holes. Preferably, the angle a is smaller than 90 degrees and greater than 45 degrees, so the second holes 142 and the first holes 112 do not interfere with each other because of the overly short distance. Furthermore, an arrangement density of the first holes 112 herein is greater than an arrangement density of the second holes 142. That is, the number of the first holes 112 on the unit area of the upper cover 110 is greater than the number of the second holes 142 on the unit area of the chamfered surfaces 140. As a result, the light emitting device 100 can dissipate the heat more quickly because of the chimney effect. Therefore, the light emitting device 100 has a better heat dissipation effect. As shown in FIG. 1, the chamfered surfaces 140 can also be located at the junctions between the upper cover 110 and two of the side covers 130*a*, and the chamfered surfaces 140 are opposite to each other. In other words, the upper cover 110 and the side covers 130*b* are connected directly, and the junctions between the upper cover 110 and the side covers 130*b* forms a right angle. However, the upper cover 110 and the side covers 130*b* can also have the chamfered surfaces including holes for ventilation (not shown). As shown in FIG. 1 and FIG. 2, the chamfered surfaces 140 of the embodiment are at least two round chamfered surfaces. Of course, in other embodiments, the chamfered surfaces 140 can also be at least two bevels as shown in the heat dissipation casing 100 of FIG. 2A, at least two ogee chamfered surfaces (not shown) or at least two cove chamfered surfaces (not shown), the invention is not limited thereto. Preferably, an aperture D2 of each of the second holes 142 is, for example, between 0.1 cm and 10 cm, and an aperture D1 of each of the first holes 112 is between 0.1 cm and 10 cm. Here, the second holes 142 and the first holes 112 have the same size, but the invention is not limited thereto.

Furthermore, referring to FIG. 2, the light emitting device 10 of the embodiment further includes two air baffles 150 so as to divide an interior of the heat dissipation casing 100 into two fluid channels L1 and L2 and one accommodating space S, wherein the fluid channels L1 and L2 are located on opposite sides of the accommodating space S. Specifically, the first holes 112 are disposed in correspondence to the accommodating space S, and the second holes 142 are disposed in correspondence to the fluid channels L1 and L2. Therefore, the fluid F can enter the heat dissipation casing 100 through the fluid channels L1 and L2 from the second holes 142 of the chamfered surfaces 140. By the guidance of the air baffles 150, the fluid F is led into the accommodating space S, and exhausts out of the heat dissipation casing 100 through the first holes 112 of the upper cover 110. Since the second holes 142 and the first holes 112 of the embodiment are not coplanar and separated by the air baffles 150, the fluid F of different temperature do not interfere with each other when the fluid F is flowing into and out of the heat dissipation casing 100. Moreover, the material of the heat dissipation casing 100 of the embodiment is preferably metal or other materials having a higher thermal conductivity, but the invention is not limited thereto.

In addition, referring to FIG. 2, the LED module 200 of the embodiment is substantially a UV LED module, but the invention is not limited thereto. The light emitting device 10 of the invention may further include a heat dissipation component 300, wherein the heat dissipation component 300 is disposed inside the heat dissipation casing 100 and located between the upper cover 110 and the LED module 200. In other words, the light emitting device 10 of the invention let the heat dissipation component 300 transfer the heat produced by the LED module 200 out of the heat dissipation casing 100 through natural convection. Here, the material of the heat dissipation component 300 can have a thermal conductivity higher than 150 W/mK, such as a heat dissipation block or multiple heat dissipating fins. Preferably, the heat dissipation component 300 are multiple heat dissipating fins. The convection effect can be improved by the spacing of the heat dissipating fins, but the invention is not limited thereto. In addition, to further improve the heat dissipation effect of the light emitting device 10, the light emitting device 10 of the invention can further include a fan 400 disposed inside the heat dissipation casing 100 and located between the upper cover 110 and the LED module 200. Here, the fan 400 is substantially located in the accommodating space S. In other words, the light emitting device 10 of the embodiment can also transfer the heat produced by the LED module 200 out of the heat dissipation casing 100 through forced convection simultaneously.

Figure 3:
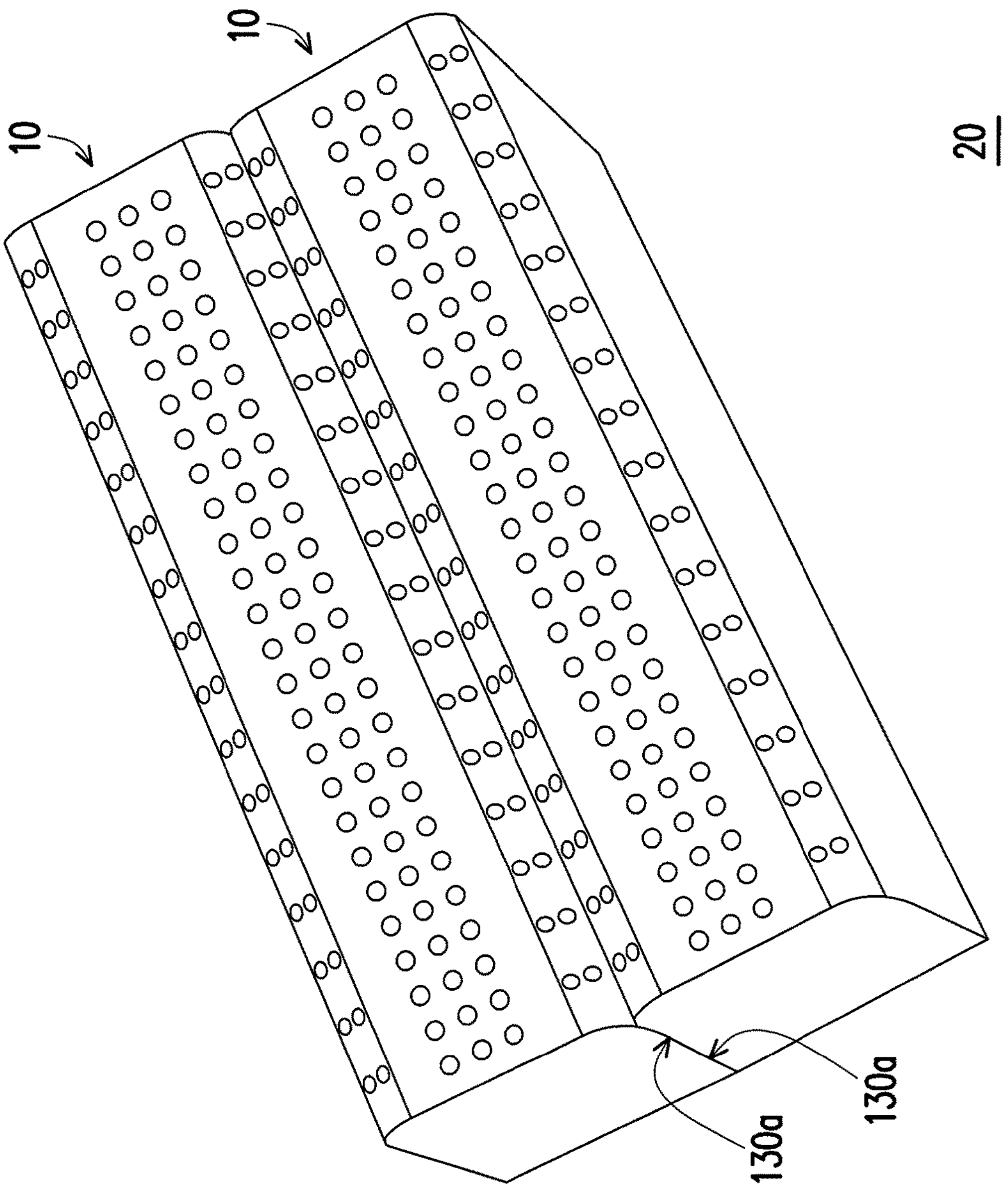
FIG. 3 and FIG. 4 are schematic three-dimensional views of spliced light emitting devices according to two embodiments of the invention respectively.
Figure 4:
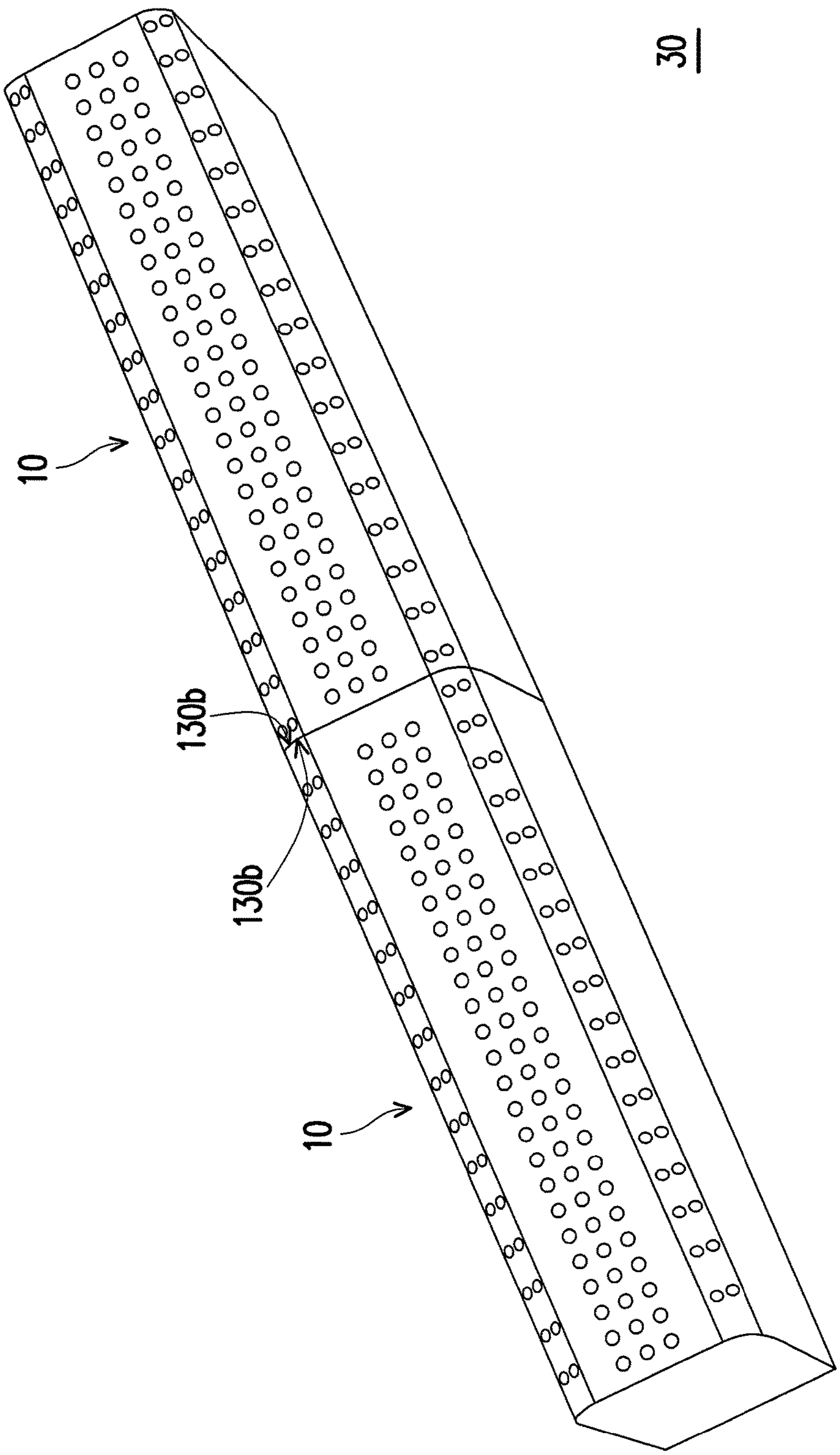

In addition, a first height H1 is between the upper cover 110 and the lower cover 120 of the embodiment, a second height H2 is between one of the side covers 130*a* connecting one of the chamfered surfaces 140 and the lower cover 120, and a ratio of the first height H1 and the second height H2 is preferably between 1.1 and 10. In this way, the light emitting device 10 can have sufficient area of the chamfered surfaces 140, and the heat dissipation effect can be effectively improved. In addition, please referring to FIG. 3, when two light emitting devices 10 are spliced, in contrast to the conventional art of disposing the air inlet at the side cover of the heat dissipation casing (not shown), the heat dissipation casing 100 of the embodiment can make the side covers 130*a* of both light emitting devices 10 spliced together to form the light emitting device 20. Or, please referring to FIG. 4, the side covers 130*b* of both light emitting devices 10 can be spliced together to form the light emitting device 30. Alternatively, in other embodiments that are not shown, the side covers 130*a*, 130*b* of a light emitting device 10 can be spliced with other light emitting devices 10 to form an array. The splicing method is not limited thereto.

Since the second holes 142 and the first holes 112 of the heat dissipation casing 100 of the light emitting device 10 of the embodiment are not coplanar, and the second holes 142 are located on the chamfered surfaces 140 located at the junctions between the upper cover 110 and two of the side covers 130*a*, the second holes 142 are not shielded because of the side splicing when the light emitting device 10 is being side spliced. Thus, the effective ventilating area of the second holes can still be preserved and better heat dissipation effect can be provided. Therefore, when the LED module 200 is applied to the UV curing process, for example, because the light emitting surface E of the LED module 200 and the first and the second holes 112, 142 are located on opposite sides of the LED module 200 respectively, the emitted light of the LED module 200 does not illuminate on the first holes 112 and the second holes 142. Consequently, the fluid F does not interfere with the light curing adhesive under irradiation and the heat dissipation and UV curing can be carried out effectively.

Figure 5:
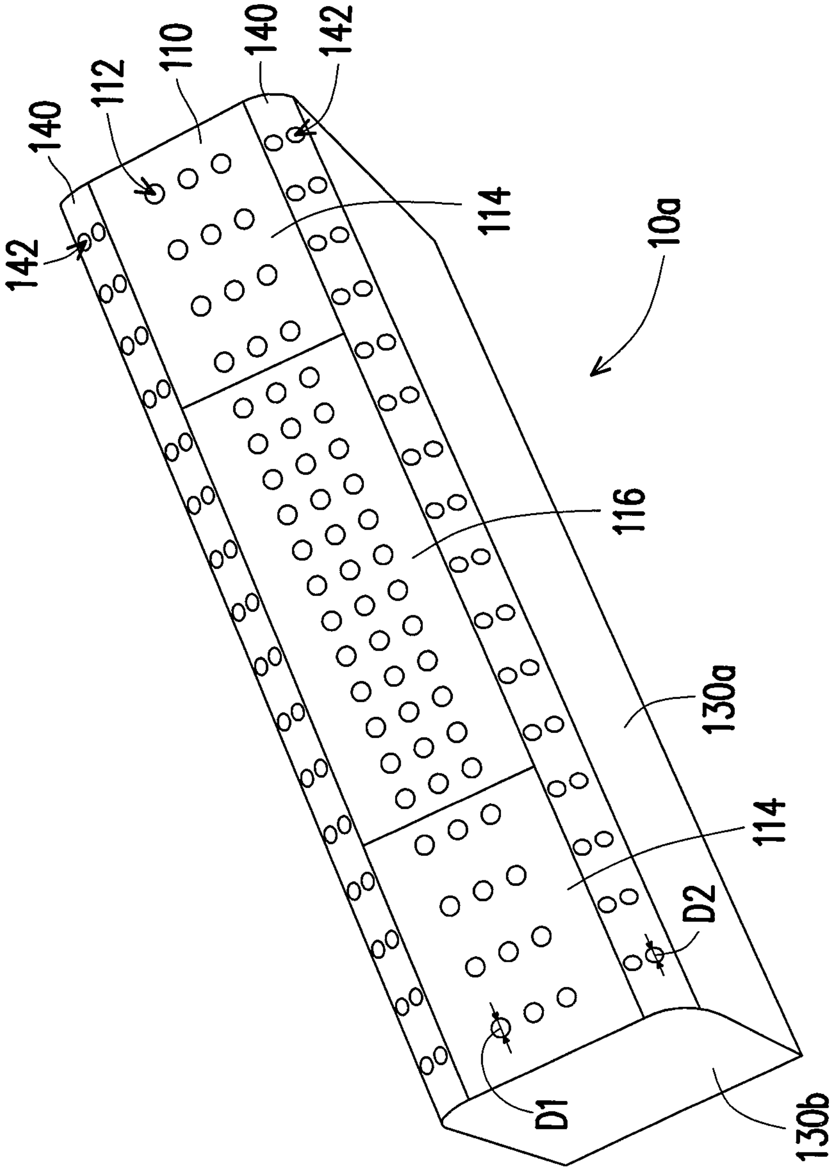
FIG. 5 and FIG. 6 are schematic three-dimensional views of light emitting devices according to two other embodiments of the invention respectively.

FIG. 5 is a schematic three-dimensional view of a light emitting device according to another embodiment of the invention. Referring to FIG. 1 and FIG. 5 simultaneously, the light emitting device 10*a* of the embodiment is similar to the light emitting device 10 of FIG. 1. The main difference therebetween lies in that the upper cover 110 of the embodiment includes two periphery portions 114 and a middle portion 116 located between the periphery portions 114. In particular, a total area of the first holes 112 located at the periphery portions 114 is smaller than a total area of the first holes 112 located at the middle portion 116. Preferably, the total area of the first holes 112 located at the middle portion 116 is 1.5 times of the total area of the first holes 112 located at the periphery portions 114. Since the total area of the first holes 112 located at the middle portion 116 is greater, the middle portion with a lower heat dissipation efficiency can have a better heat dissipation effect.

Figure 6:
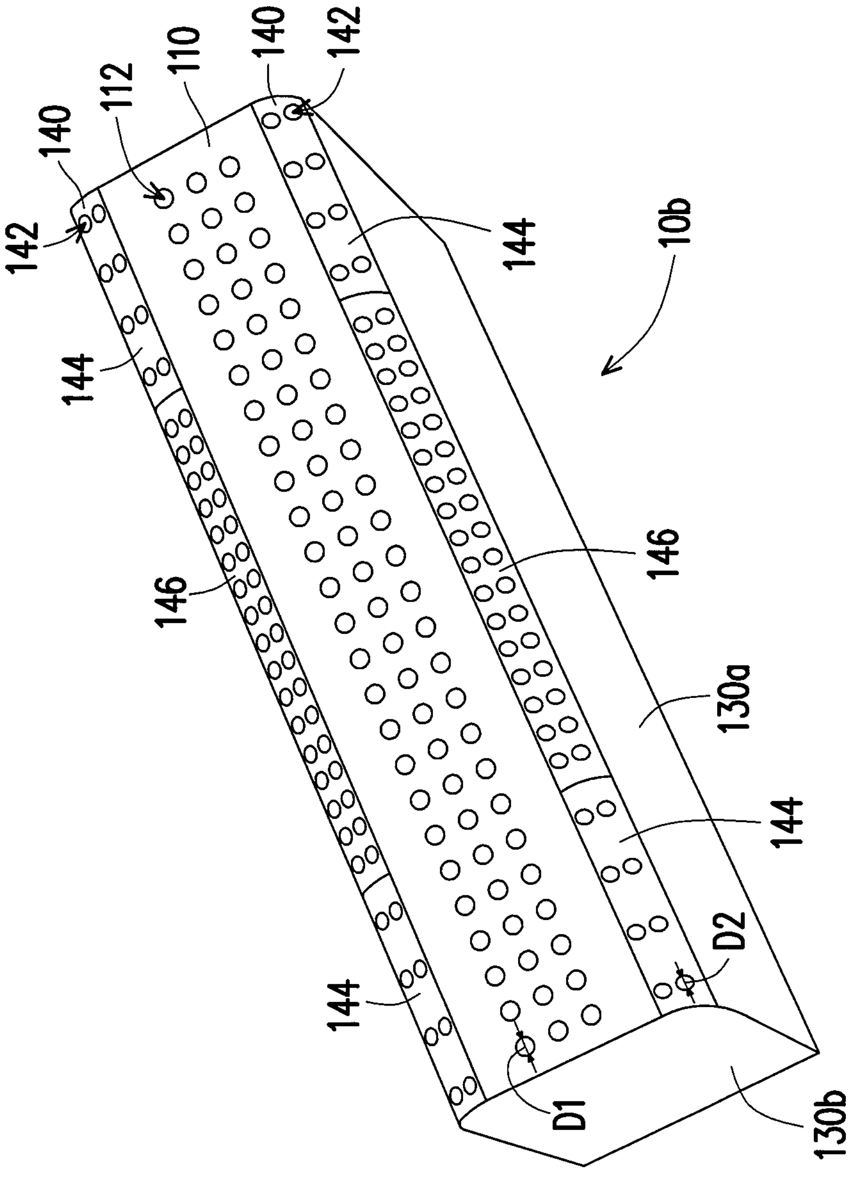

FIG. 6 is a schematic three-dimensional view of a light emitting device according to another embodiment of the invention. Referring to FIG. 1 and FIG. 6 simultaneously, the light emitting device 10*b* of the embodiment is similar to the light emitting device 10 of FIG. 1. The main difference therebetween lies in that the chamfered surfaces 140 of the embodiment include two end surfaces 144 and a middle surface 146 located between the end surfaces 144. In particular, a total area of the second holes 142 located at the end surfaces 144 is smaller than a total area of the second holes 142 located at the middle surface 146. Preferably, the total area of the second holes 142 located at the middle surface 146 is 1.5 times of the total area of the second holes 142 located at the end surfaces 144. Since the total area located at the middle surface 146 is greater, the middle portion with a lower heat dissipation efficiency can have a better heat dissipation effect.

Based on the above, since the second holes of the heat dissipation casing of the invention are located on the chamfered surfaces located at junctions between the upper cover and the side covers, that is, the second holes and the first holes are not coplanar, and the first and the second holes and the light emitting surface of the LED module are located on opposite sides of the LED module respectively, the inletting of the fluid into the heat dissipation casing and the exhausting of the fluid from the heat dissipation casing do not interfere with each other. In addition, when the light emitting device is being side spliced, the second holes are not shielded because of the side splicing. So the effective ventilating area of the second holes can still be preserved and better heat dissipation effect can be provided.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A light emitting device, comprising:

a heat dissipation casing, comprising:

an upper cover having a plurality of first holes;

a lower cover being opposite to the upper cover;

a plurality of side covers connected to the upper cover and the lower cover, wherein at least two of the plurality of side covers include at least two of chamfered surfaces and at least two side surfaces, each of the at least two of chamfered surfaces connects the upper cover and one of the at least two side surfaces, and each of the at least two side surfaces connects each of the at least two of chamfered surfaces and the lower cover, and the chamfered surfaces have a plurality of second holes, and a total area of the second holes of the chamfered surfaces is smaller than a total area of the first holes of the upper cover; and two air baffles dividing an interior of the heat dissipation casing into two fluid channels and one accommodating space, wherein the accommodating space is a gap between the two fluid channels, and the first holes are disposed in correspondence to the accommodating space, and the second holes on the at least two of chamfered surfaces are disposed in correspondence to the two fluid channels; and an LED module disposed inside the heat dissipation casing and located on the lower cover, wherein the LED module has a light emitting surface, and the light emitting surface and the first and the second holes are located on opposite sides of the LED module respectively.

2. The light emitting device according to claim 1, wherein an angle between a first normal vector of the upper cover and a second normal vector of any of the chamfered surfaces is smaller than 90 degrees.

3. The light emitting device according to claim 2, wherein the angle between the first normal vector of the upper cover and the second normal vector of any of the chamfered surfaces is smaller than 90 degrees and greater than 45 degrees.

4. The light emitting device according to claim 1, wherein the chamfered surfaces are at least two bevels or at least two round chamfered surfaces.

5. The light emitting device according to claim 1, wherein an arrangement density of the first holes is greater than an arrangement density of the second holes.

6. The light emitting device according to claim 1, wherein the upper cover comprises two periphery portions and a middle portion located between the periphery portions, and a total area of the first holes located at the periphery portions is smaller than a total area of the first holes located at the middle portion.

7. The light emitting device according to claim 1, wherein each of the chamfered surfaces comprises two end surfaces and a middle surface located between the end surfaces, and a total area of the second holes located at the end surfaces is smaller than a total area of the second holes located at the middle surface.

8. The light emitting device according to claim 1, further comprising:

a fan disposed inside the heat dissipation casing and located between the upper cover and the LED module.

9. The light emitting device according to claim 1, further comprising:

a heat dissipation component disposed inside the heat dissipation casing and located between the upper cover and the LED module.

10. The light emitting device according to claim 1, wherein a first height is between the upper cover and the lower cover, a second height is between the lower cover and one of the side surfaces connecting one of the chamfered surfaces, and a ratio of the first height and the second height is between 1.1 and 10.

11. The light emitting device according to claim 1, wherein a fluid enters the heat dissipation casing through the two fluid channels from the second holes of the at least two of chamfered surfaces and the fluid exhausts out of the heat dissipation casing through the first holes of the upper cover.

12. The light emitting device according to claim 1, wherein an aperture of each of the first holes is between 0.1 cm and 10 cm, and an aperture of each of the second holes are between 0.1 cm and 10 cm.

13. The light emitting device according to claim 1, wherein orthogonal projections of the second holes on the lower cover overlap orthogonal projections of the two fluid channels on the lower cover.

14. The light emitting device according to claim 1, wherein orthogonal projections of the two fluid channels on the lower cover do not overlap with an orthogonal projection of the accommodating space on the lower cover.

15. A light emitting device, comprising:

two heat dissipation casings, each of the two heat dissipation casings comprising:

an upper cover having a plurality of first holes;

a lower cover being opposite to the upper cover; and a plurality of side covers connected to the upper cover and the lower cover, wherein at least two of the plurality of side covers include at least two of chamfered surfaces and at least two side surfaces, each of the at least two of chamfered surfaces connects the upper cover and one of the at least two side surfaces, and each of the at least two side surfaces connects each of the at least two of chamfered surfaces and the lower cover, and the chamfered surfaces have a plurality of second holes, and a total area of the second holes of the chamfered surfaces is smaller than a total area of the first holes of the upper cover; and two LED modules, respectively disposed inside the two heat dissipation casings, each of the two LED modules is located on the lower cover and has a light emitting surface, and the light emitting surface and the first and the second holes are located on opposite sides of each of the two LED modules respectively;

wherein one of the plurality of side covers of one of the two heat dissipation casings is spliced with one of the plurality of side covers of the other of the two heat dissipation casings, and one of the at least two side surfaces of one of the two heat dissipation casings is spliced with one of the at least two side surfaces of the other of the two heat dissipation casings without shielding the second holes.

* * * * *